Patented Aug. 6, 1935

2,010,029

UNITED STATES PATENT OFFICE 2,010,029

TREATMENT OF MOTOR FUEL

Jacque C. Morrell and Charles G. Dryer, Chicago, Ill., assignors to Universal Oil Products Company, Chicago, Ill., a corporation of South Dakota No Drawing. Application January 11, 1932, Serial No. 586,072

12 Claims. (Cl. 44—9)

This invention relates to the treatment of motor fuels, and refers more particularly to the treatment of cracked distillates of gasoline boiling range or those containing a substantial proportion of gasoline, such distillates being generally characterized by a relatively high knock rating.

More specifically the invention has reference to processes of treatment whereby th deterioration of such fuels on storage with respect to gum formation, and particularly anti-knock value, is substantially prevented, under the varying influence of light, air, et cetera, to which they are subjected.

Prior to the advent of the cracking process as a factor in the trade, the straight run gasolines produced either by simple distillation from crudes or by absorption from casinghead gases were of an essentially saturated character, containing only negligible amounts of olefinic and cyclic hydrocarbons so that they underwent substantially no change when stored for long periods of time, particularly if reasonably protected from the influence of light and air.

When cracked gasolines became an important factor in the trade it was found that their more unsaturated olefinic constituents such as the di and tri olefins were characterized by a tendency to deposit gummy or resinous materials upon standing, particularly under the influence of light and air and were objectionable constituents on account of this gum-forming tendency as well as on account of their loss as possible anti-knock material due to the gum-forming or polymerization reactions. During the gum-forming period in the storage of cracked gasoline a yellow to brown color sometimes develops which is distinctly undesirable from a sales standpoint. The present invention is directed to preventing the formation of these undesirable gums and colored compounds and the reduction in knock rating of the motor fuel, although it is to be particularly pointed out that gum and color formation and reduction in anti-knock value are not necessarily related and that the accomplishment of the two objects may not be brought about simultaneously, that is, they may be independent of each other.

The field of choice for the selection of substances to act as inhibitors in preventing the development of undesirable characteristics in cracked gasolines on storage is large and many individual chemical compounds have been found to be of special value, their use, however, being limited many times by their scarcity and high cost of manufacture. Furthermore, it is possible that certain compounds or mixtures of compounds might be discovered which would inhibit separately the formation of gum, color or decrease in knock rating, although in most instances it has been found that the development of gums and color and loss in anti-knock value are closely related so that whatever inhibits one type of change also inhibits the other.

Inhibitors are to be distinguished from anti-knock agents in that the true anti-knock agent modifies the combustion of fuel in an internal combustion engine cylinder but does not necessarily prevent the development of undesirable characteristics under storage. In fact, numerous known anti-knock agents are themselves unstable in storage and the gasoline to which they are added needs further additions of true inhibitors to stabilize the increased anti-knock value produced by the addition of the anti-knock agent. Furthermore, it is usually necessary to use much higher percentages of reagents to prevent knocking than is necessary in inhibiting deterioration and depreciation of the gasoline so that it will be seen that in the great majority of cases the action of anti-knock agents is distinct from that of true inhibitors, the use of which constitutes the present invention.

In one specific embodiment the present invention comprises the use of coal tars or particular fractions obtained in the distillation of coals or of tars obtained therefrom as inhibitors for preventing the deterioration of the quality of gasolines on storage. The invention has specific reference to the use of the so-called low temperature coal tars, or distillates obtained therefrom.

The by-product distillation of coal is an art of long standing and the various types of compounds produced in the process will be given only brief mention at this point. Of the hydrocarbons produced members of the paraffin, ethylene, acetylene and benzene series have all been identified, with the last-named group predominating, particularly in operations conducted at relatively high temperatures for the manufacture of coal gas and metallurgical coke. Associated with these hydrocarbons of varying boiling point are numerous oxygen-containing and sulfur-containing compounds and many nitrogen derivatives of hydrocarbons, principally of a heterocyclic character.

The inhibiting value of particular fractions from coal tar has been found to be in many cases much greater than that which might be predictable based upon their analytical content of known compounds, and it is this feature that constitutes one of the principal points of the present invention in addition to the fact that fractions are more readily produced than the individual compounds which might be used as inhibitors, and are therefore cheaper. Furthermore, it is recognized that analytical procedures are inadequate to completely determine the composition of these complex high boiling mixtures and that compounds may exist whose composition is not precisely determinable which exert a powerful retarding effect on the deterioration of properties in gasolines. It may also be observed that frequently mixtures of chemical compounds utilizable as inhibitors have a greater inhibiting value than would result from the mere addition of properties so that altogether the use of what may be termed "natural" mixtures of blends of inhibiting substances as they occur in coal tar fractions has distinctly novel and useful features.

The invention further comprises the utilization of mixtures of components separated by treating coal tar fractions with caustic alkalies and later acidification, the mixtures in this case being substantially free from materials unacted upon by bases. This preliminary separation step may be utilized in cases where heavy neutral tars are present in amounts sufficient to cause either gum, discoloration or cloudiness in the gasolines to which they are added.

It is also comprised within the scope of the invention to utilize as inhibitors the mixtures of basic material removable from coal tar fractions by treatment with dilute sulfuric acid, the compounds being released from acid combination by additions of strong alkali. The use of neutral oils as inhibitors resulting from, or remaining after, treatment with acids and alkalies is comprised within the scope of the invention.

The selection of a coal tar or coal tar fraction for use in preventing the deterioration of any given gasoline on storage will be determined by consideration of a large number of factors. Primarily, the chemical composition of cracked and straight-run gasolines from different sources will vary markedly in respect to the percentages of those classes of compounds which require stabilization by the use of inhibitors. For example, when cracked gasolines are produced under relatively high temperatures and low superatmospheric pressures by processes currently known as "vapor phase" cracking processes, the percentages of di and tri olefins may be relatively high resulting in a pronounced tendency toward polymerization with attendant depreciation in value of the gasoline stock. In such cases more highly efficient coal tar fractions may be used, and percentages of the order of from possibly 0.01 to 2.0%. When more nearly saturated gasolines are produced from intermediate petroleum distillates of a relatively saturated character and under higher superatmospheric pressures and lower temperatures, either smaller amounts of the more efficient fractions or the same amounts of relatively less efficient may suffice to effect the required stabilization of properties. In most cases the proper selection will be readily made by a few experiments and present no unusual difficulties.

To indicate the merits of the invention some experimental data may be introduced to show the results obtained by the use of coal tar fractions characteristic of the present invention. In obtaining the data shown in the succeeding tabulation use was made of the oxygen bomb test which at the present time is quite generally accepted as a measure of the tendency of gasolines to deteriorate on storage, an induction period of four hours preceding measurable oxygen absorption having been arbitrarily adopted as indicating a sufficiently stable gasoline:

| Sample | Percent | Color, Saybolt | Induction period |
| --- | --- | --- | --- |
| Low temperature tar | 0.01 | 13 | 270' |
| Low temperature tar | 0.05 | Dark | 1155' |
| Fractions: | | | |
| 1. Initial–200° C. | 0.01 | 30 plus | 120' |
| 2. 200°–225° | 0.01 | 30 plus | 240' |
| 3. 225°–250° | 0.01 | 30 plus | 345' |
| 4. 250°–275° | 0.01 | 30 plus | 435' |
| 5. 275°–300° | 0.01 | 30 plus | 330' |
| 6. 300°–325° | 0.01 | 30 plus | 375' |
| 7. 325 bottoms | 0.01 | Dark | 60' |

The gasoline utilized in the tests, the results of which are shown above, was produced by the cracking of a highly paraffinic fuel oil from the Pennsylvania field under approximately 300 pounds per square inch pressure and a maximum cracking temperature of 940° F. The gravity of the gasoline was approximately 61.0° A. P. I. and the end point 410° F. It is particularly to be observed from the table that the 250 to 275° C. fraction produced markedly better results than the other fractions tested, even when percentages as low as 0.01% were used.

The foregoing specification and examples have disclosed the nature of the present invention, but neither should be considered in the light of embodying limitations thereon, since it is evidently broad in scope and applicable in many other cases than the one given.

We claim as our invention:

1. A process for reducing deterioration of cracked gasoline containing gum-forming unsaturates, which comprises adding to the gasoline a small amount of a coal tar fraction containing a sufficient quantity of constituents of the tar boiling between 200° C. and 325° C. to substantially inhibit gum formation in the gasoline.

2. A process for reducing deterioration of cracked gasoline containing gum-forming unsaturates, which comprises adding to the gasoline a small amount of coal tar distillate boiling between 200° C., and 325° C.

3. A process for reducing deterioration of cracked gasoline containing gum-forming unsaturates, which comprises adding to the gasoline a small amount of coal tar distillate boiling between 250° C., and 275° C.

4. Motor fuel comprising cracked gasoline stabilized against gum formation by the incorporation thereinto of a small amount of a coal tar fraction containing a sufficient quantity of constituents of the tar boiling between 200° C. and 325° C. to substantially inhibit gum formation in the gasoline.

5. Motor fuel comprising cracked gasoline containing a small amount of a coal tar distillate boiling between 200° C. and 325° C.

6. Motor fuel comprising cracked gasoline containing a small amount of a coal tar distillate boiling between 250° C. and 275° C.

7. A method for stabilizing cracked hydrocarbon motor fuel which comprises incorporating into the fuel a relatively small amount of a low temperature coal tar fraction containing alkali-soluble and alkali-insoluble constituents of the coal tar and a sufficient quantity of constituents of the tar boiling between 200° C. and 325° C. to substantially inhibit gum formation in the fuel.

8. A method for stabilizing cracked hydrocarbon motor fuel which comprises incorporating into the fuel a relatively small amount of a low temperature coal tar distillate containing alkali-soluble and alkali-insoluble constituents of the coal tar and a sufficient quantity of constituents of the tar boiling between 200° C. and 325° C. to substantially inhibit gum formation in the fuel.

9. A method for stabilizing cracked hydrocarbon motor fuel which comprises incorporating into the fuel a relatively small amount of a low temperature coal tar distillate boiling between 200° C. and 325° C. and containing alkali-soluble and alkali-insoluble constituents of the coal tar.

10. Cracked hydrocarbon motor fuel to which has been added a relatively small amount of a low temperature coal tar fraction containing alkali-soluble and alkali-insoluble constituents of the coal tar and a sufficient quantity of constituents of the tar boiling between 200° C. and 325° C. to substantially inhibit gum formation in the fuel.

11. Cracked hydrocarbon motor fuel to which has been added a relatively small amount of a low temperature coal tar distillate containing alkali-soluble and alkali-insoluble constituents of the coal tar and a sufficient quantity of constituents of the tar boiling between 200° C. and 325° C. to substantially inhibit gum formation in the fuel.

12. Cracked hydrocarbon motor fuel to which has been added a relatively small amount of a low temperature coal tar distillate boiling between 200° C. and 350° C. and containing alkali-soluble and alkali-insoluble constituents of the coal tar.

JACQUE C. MORRELL.
CHARLES G. DRYER.